June 9, 1942.   L. J. VALUSEK   2,285,475
MATERIAL HANDLING DEVICE
Filed Aug. 3, 1940   4 Sheets-Sheet 1

INVENTOR.
LADD J. VALUSEK.
BY Barnes Kisselle Laughlin & Raisch
ATTORNEYS.

June 9, 1942. L. J. VALUSEK 2,285,475
MATERIAL HANDLING DEVICE
Filed Aug. 3, 1940 4 Sheets-Sheet 2

INVENTOR.
LADD J. VALUSEK
BY
Barnes, Kisselle, Laughlin & Raisch
ATTORNEYS

June 9, 1942.   L. J. VALUSEK   2,285,475
MATERIAL HANDLING DEVICE
Filed Aug. 3, 1940   4 Sheets-Sheet 3

INVENTOR.
LADD J. VALUSEK
BY Barnes, Kisselle, Laughlin & Raisch
ATTORNEYS.

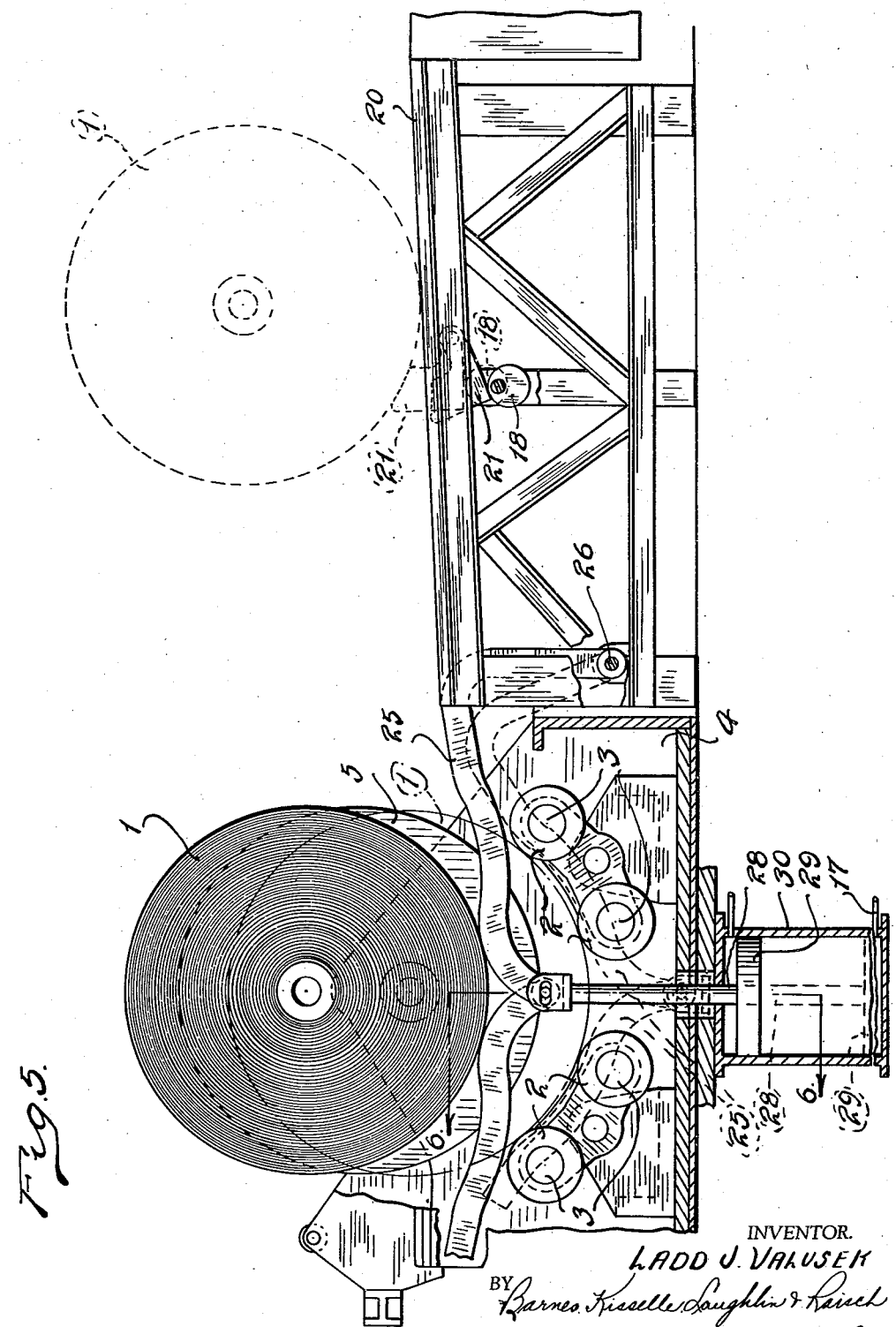

Patented June 9, 1942

2,285,475

UNITED STATES PATENT OFFICE 2,285,475

MATERIAL HANDLING DEVICE

Ladd J. Valusek, Fenton, Mich., assignor to General Motors Corporation, Detroit, Mich., a corporation of Delaware Application August 3, 1940, Serial No. 350,710

5 Claims. (Cl. 214—95)

This invention relates to a material handling device and more particularly to a device for loading a sheet metal roll into an uncoiling cradle.

Many difficulties are incurred in the handling of large rolls or coils of sheet metal strip. This is particularly true when the coil weighs several tons.

It is the object of this invention to produce a device for loading a sheet metal roll into an uncoiling cradle which is of simple structure, easily and safely operated whereby injury to the workman and damage to the cradle as well as the coil are entirely avoided.

In the drawings:

Fig. 5 is a side elevation of a modified form of loader.

Figure 1:
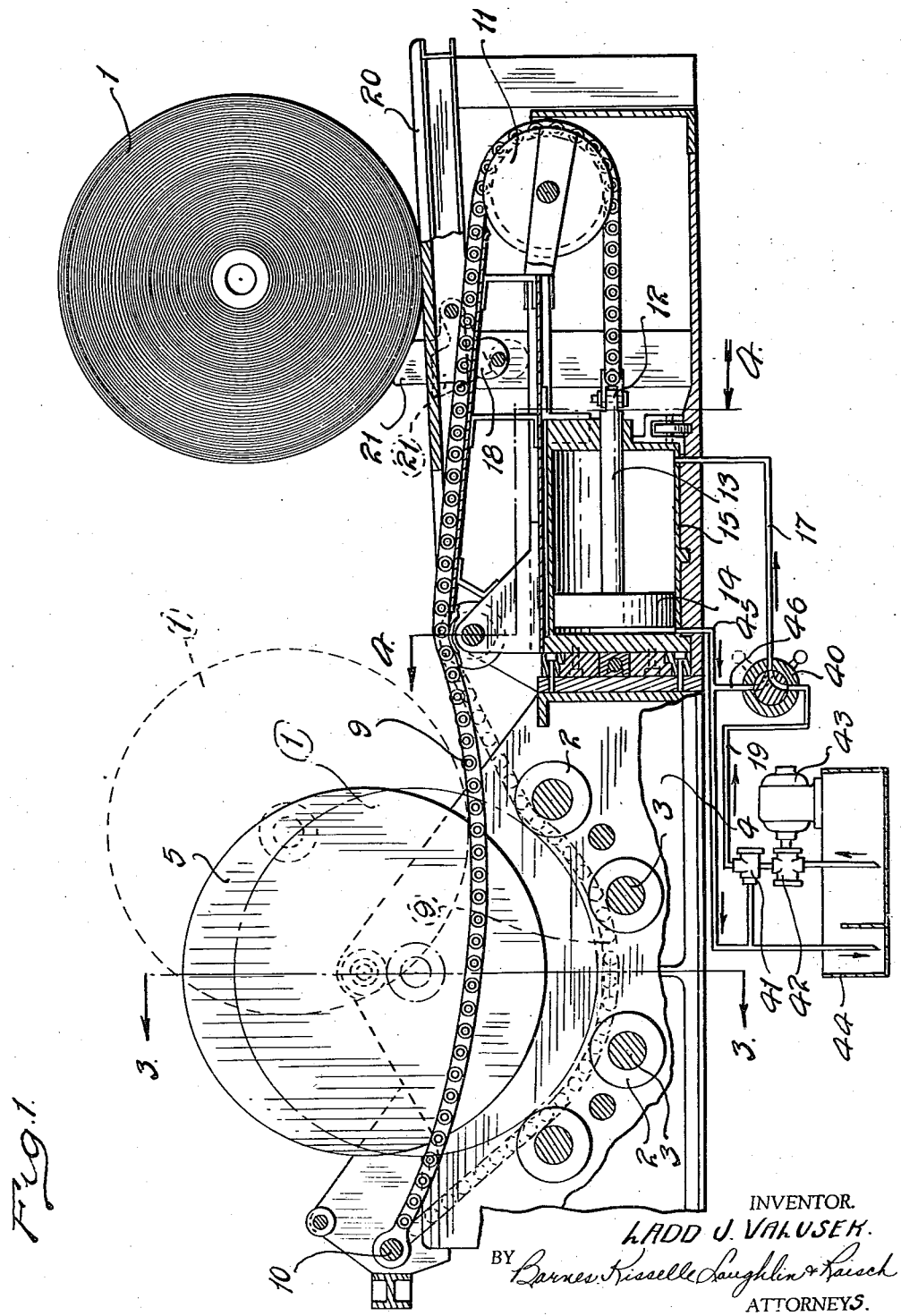
Fig. 1 is a side elevation partly in section showing the combined cradle and loader.
Figure 2:
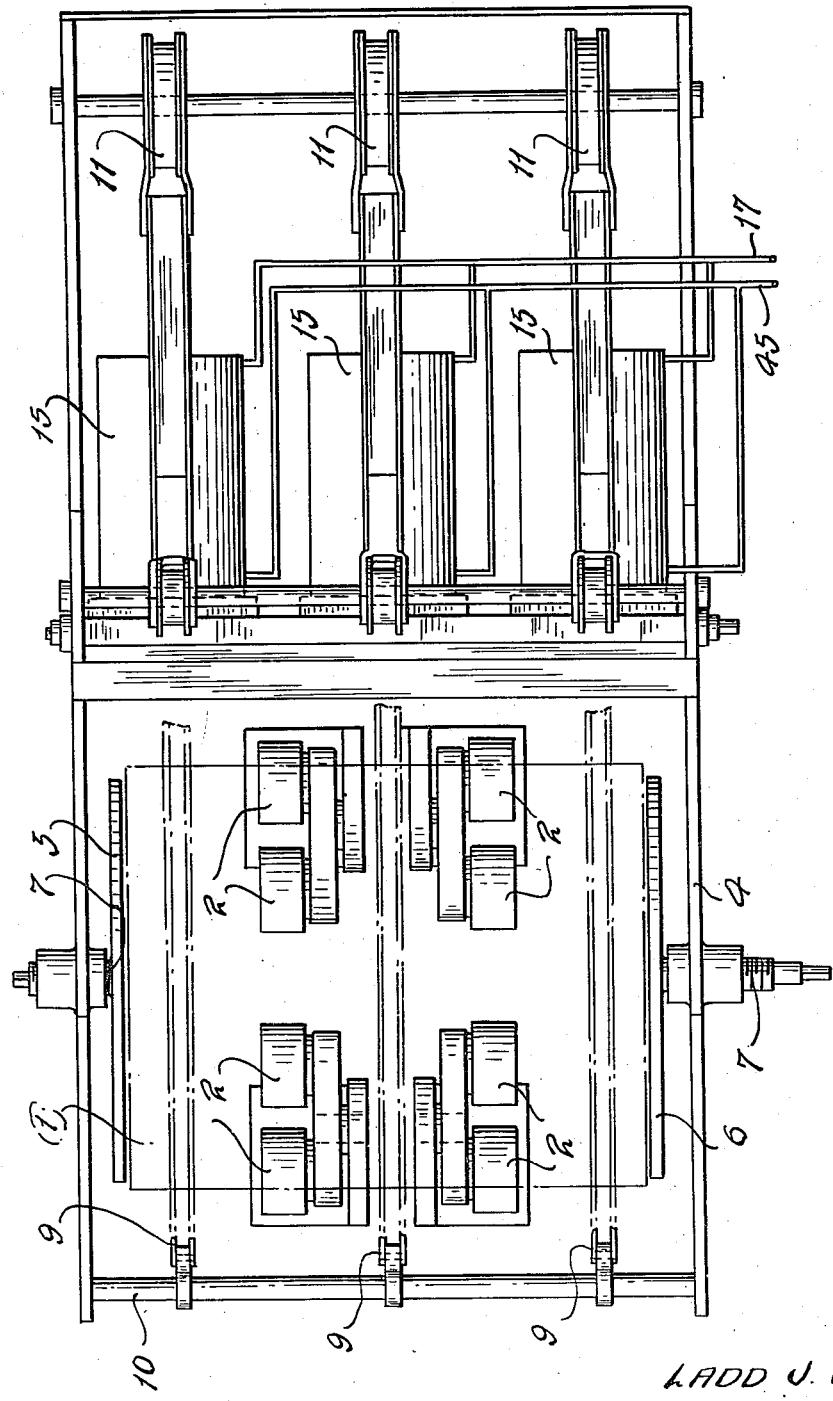
Fig. 2 is a top plan view of the combined cradle and loader.
Figure 3:
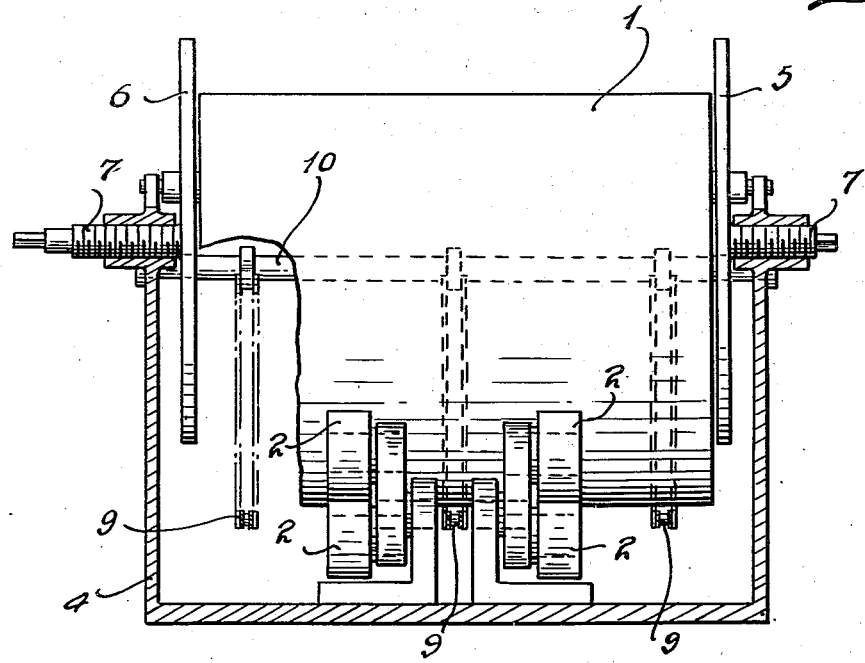
Fig. 3 is a section along the line 3—3 of Fig. 1.
Figure 4:
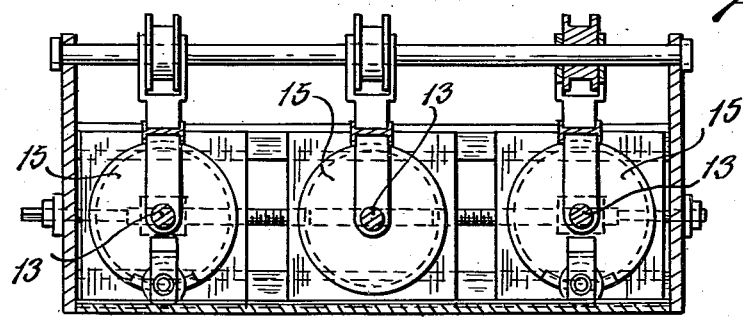
Fig. 4 is a section along the line 4—4 of Fig. 1.
Figure 6:
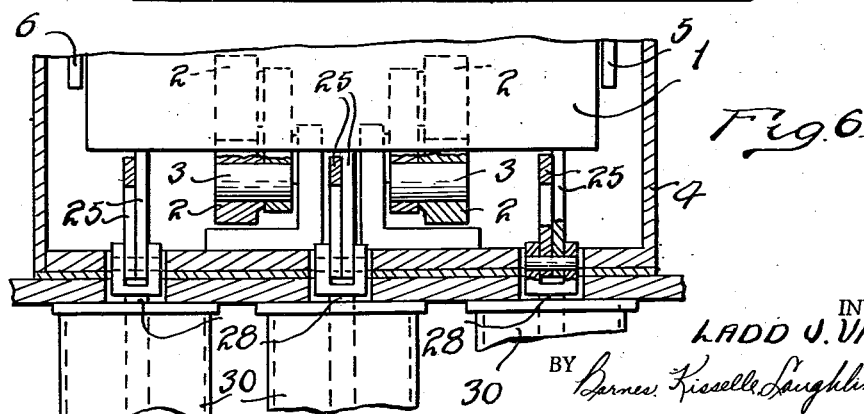
Fig. 6 is a section along the line 6—6 of Fig. 5.

Referring more particularly to the drawings, the cradle which is to be loaded with the roll 1 of sheet metal strip comprises a plurality of rollers 2 mounted on horizontal shafts 3 carried by a suitable frame 4. The rollers are positioned arcuately so that they fit the cylindrical surface of the roll. The roll 1 is held centered on the rollers by a pair of discs 5 and 6. Discs 5 and 6 are adjustable by means of screws 7 to center the roll 1 on the rollers 2.

To facilitate loading the roll 1 into the cradle, the cradle is provided with a plurality of chains 9 each of which is affixed at one end to the cradle frame 4 as at 10. Each of the chains 9 is passed around a pulley 11 and has its other end fixed as at 12 to a piston rod 13 carried by piston 14 in cylinder 15. A separate cylinder and piston is provided for each chain 9.

Fluid, preferably oil, under pressure is supplied to the cylinder 15 by line 17, which connects through rotary valve 40, relief valve 41 with oil pump 42 driven by motor 43 which pumps the oil from reservoir 44. Line 45 connects cylinder 15 in back of piston 14 with reservoir 44. Valve 40 connects with line 45 through line 46. In the full line showing of Fig. 1, oil under pressure flows from pump 42 through line 19, valve 40 and line 17 into the right hand end of cylinder 15 thus moving the piston to the left (Fig. 1). If valve 40 is now rotated counterclockwise ninety degrees, line 17 is connected by valve 40 with line 46 and return line 45. Valve 40 at this time closes line 19. The oil now drains slowly from cylinder 15, through line 17, valve 40, lines 46 and 45 into the reservoir, thus permitting the piston 14 to gradually move toward the right, Fig. 1.

The coil 1 is rolled upon stationary table 20 from a truck or other suitable vehicle. Table 20 is inclined downwardly toward chain 9. Roll 1 is held stationary on the inclined table 20 by dog 21 controlled by eccentric 18. Preferably chains 9 are slightly slack preparatory to receiving the roll 1. When dog 21 is released by turning eccentric 18 to dotted line position (Fig. 1), roll 1 rolls down inclined table 20 and on to chains 9 above the cradle 4.

At this time valve 40 is operated so that fluid is exhausted slowly from cylinders 15 to the right of pistons 14 (Fig. 1). As the piston moves slowly to the right, chains 9 are gradually slacked off permitting the roll 1 to gradually lower into the cradle 4 until it rests upon the rollers 2.

After the roll 1 is used up in manufacture, the cradle is ready to be reloaded. Preparatory to reloading, valve 40 is operated to admit fluid under pressure through line 17 into cylinder 15. This causes piston 14 to move to the left thereby drawing chains 9 around roller 11 to elevate the same above the cradle in their original slightly slack position to receive a new roll or coil of strip sheet metal.

In the modified form shown in Fig. 5, instead of a plurality of chains 9 there is provided a plurality of pairs of rails 25. The outer ends of the rails 25 have a pivotal connection as at 26 with the cradle frame 4 and the inner end of the rails are pivotally connected with a pin and slot connection 27 to the upper end of a vertically reciprocable piston rod 28 secured to piston 29 in vertical cylinder 30. Cylinders 30 are connected to a source of fluid under pressure in the same manner as cylinder 15. When the rails 25 are raised, the coil 1 is rolled on to the same and fluid is gradually exhausted from beneath the piston 29 to slowly lower the rails and coil 1 on to rolls 2 in the cradle. After the coil is used, rails 25 are again raised by admitting fluid under pressure into the cylinder below the piston and exhausting fluid from above the piston.

It will be noted that both in the principal and modified forms of the invention that the chain 9 and rails 25 serve as elevators primarily for lowering the coil 1 into the cradle. The elevators 9 and 25 can be used for raising the roll 1 out of the cradle 4, but normally will not be raised until the coil is completely used.

The word "chain" is used broadly herein to include such obvious substitutes therefor as a rope or wire cable.

I claim:

1. The combination with a cradle for supporting a roll of strip metal, of an elevator in the form of a sling arranged to raise and lower in said cradle and to receive said roll while raised, a relatively fixed support for one end of the sling and a relatively movable support for the other end of the sling whereby after the roll is deposited upon the raised sling the movable support of the sling is actuated to slacken the sling and lower the roll into the cradle.

2. The combination with a cradle for supporting a roll of strip metal, of an elevator in the form of a sling arranged to raise and lower in said cradle and to receive said roll while raised, a relatively fixed support for one end of the sling and a relatively movable support for the other end of the sling, and power means for moving the said movable support to slacken the sling after the roll is deposited thereon to lower the roll into the cradle.

3. The combination with a cradle for a roll of metal, of an elevator in the form of a plurality of chains having one end fixed to the cradle and arranged to extend across the cradle, a movable support for the other end of the chains whereby after the said roll is placed upon the chains while raised the movable support is moved to slacken the chains and lower the roll into the cradle.

4. The combination with a cradle for a roll of metal, of a plurality of chains extending across the cradle when raised, each of the chains having one end fixed and the other end connected to a movable support, power means for moving said support to slacken the chains and lower the same with the roll deposited thereon into the said cradle.

5. The combination of a cradle for a roll of metal, of a plurality of chains having one end fixed to the said cradle and extending across the cradle when raised, a plurality of pulleys around which the chains pass, and power means connected to the other end of the chains for tightening and slackening the said chains for raising and lowering the same.

LADD J. VALUSEK.